United States Patent [19]

Hance et al.

[11] 4,179,309
[45] Dec. 18, 1979

[54] MEANS FOR ASSEMBLING EXPENDABLE IMMERSION THERMOCOUPLES

[75] Inventors: Richard J. Hance, Philadelphia; John R. Wiese, Dresher, both of Pa.

[73] Assignee: Leeds & Northrup Company, North Wales, Pa.

[21] Appl. No.: 952,378

[22] Filed: Oct. 18, 1978

[51] Int. Cl.² .............................................. H01V 1/02
[52] U.S. Cl. .................................. 136/234; 136/232; 73/359 R
[58] Field of Search ............. 73/359 R; 136/232, 234

[56] References Cited

U.S. PATENT DOCUMENTS

| 3,246,520 | 4/1966 | Gaskill et al. | 73/359 R |
| 3,643,509 | 2/1972 | Surinx | 136/234 X |
| 3,664,882 | 5/1972 | Hance | 136/234 |
| 3,725,134 | 4/1973 | Gessner et al. | 136/234 |

Primary Examiner—Leland A. Sebastian
Attorney, Agent, or Firm—Raymond F. MacKay; William G. Miller, Jr.

[57] ABSTRACT

An expendable immersion thermocouple having a ceramic body member and a plastic tailpiece for supporting the thermocouple and producing a cavity into which a refractory cement is poured to secure the thermocouple in place. The tailpiece is provided with axially-extending resilient arms with enlarged end portions to serve as latching devices to temporarily hold the tailpiece to the ceramic body.

5 Claims, 7 Drawing Figures

MEANS FOR ASSEMBLING EXPENDABLE IMMERSION THERMOCOUPLES

BACKGROUND OF THE INVENTION

This invention relates to expendable immersion thermocouples and more particularly to a structure that simplifies the manufacture of the thermocouples.

Expendable immersion thermocouples were first disclosed in U.S. Pat. No. 2,999,121-Mead. Since that time, these devices have been adopted as the accepted way to take temperature measurements of molten metals. In view of the wide acceptance of such devices, millions of expendable immersion thermocouples are used annually throughout the world. In view of the wide usage of such devices, it is important that they be easy to assemble and yet rugged, durable, and accurate, so that readings made by these devices can be depended upon. Many different designs and constructions of such expendable immersion thermocouples have been proposed since the Mead invention. Typical of such improved units are those disclosed in U.S. Pat. No. 3,298,874 which discloses a one piece molded plastic part which supports the electrical conductors connected to the thermocouple and also provides mechanical support for the thermocouple until a refractory cement is poured into a cavity formed in the molded plastic part. When the refractory cement hardens a rigid unit is formed having a desirable electrical and heat insulating properties. Other expendable immersion thermocouples have taken a form such as shown in U.S. Pat. No. 3,950,992, in which a ceramic body member has cemented to one end thereof a tailpiece member formed of plastic in which the tailpiece member supports the conductors leading to the thermocouple. While such prior art devices have provided dependable expendable immersion thermocouples, the manufacture of these devices has required the time-consuming procedure of gluing the tailpiece and the body member together and permitting the glue to set before proceeding further with the final assembly of the expendable immersion thermocouple device.

It is an object of this invention to provide an improved structure that permits more rapid and easy assembly of an expendable immersion thermocouple by providing a self-latching arrangement whereby the tailpiece and the body member, when assembled mechanically, latch themselves together. Applicants' invention may best be understood from the following written description taken together with reference to the various figures of drawings.

DESCRIPTION OF THE DRAWINGS

Referring to FIG. 1, there is shown a sectional view of a cylindrical body member 10 which preferably is made of a ceramic such as Cordierite which is comprised of alumina, magnesia, and silica. Body member 10 has an axially extending opening therethrough, producing a first irregularly shaped cylindrical cavity 12 in one end thereof, and a second irregularly shaped cylindrical cavity 14 in the other end thereof. The cavity 12, it will be observed, is larger than the cavity 14. Because of the dimensional differences of the cavity 14 and the cavity 12, there is produced within the body member 10 a circumferential shoulder 16. The sidewalls of the cavity 14 are provided with a pair of axially extending grooves 18 and 20.

Referring to FIGS. 3, 4, and 5, there is shown a tailpiece member 22 which preferably is molded of a resilient plastic. The tailpiece member 22 includes a plug portion 24, a circumferential flange 26, and a thermocouple contact support member 28. Additionally, the tailpiece member 22 includes a pair of resilient arms 30 and 32, having enlarged distal ends. The enlarged distal ends of resilient arms 30 and 32 provide inclined plane surfaces 30a and 32a which, as explained later, provide a securing means to hold the tailpiece member 22 within the body member 10.

Figure 4:
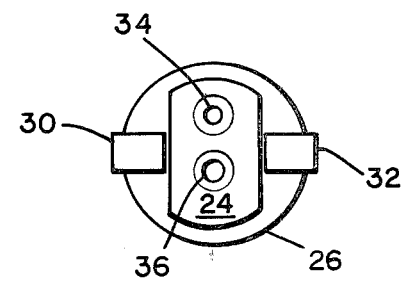
FIG. 4 is a plan view of the tailpiece shown in FIG. 3.
Figure 2:
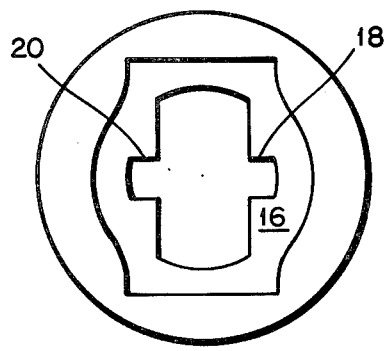
FIG. 2 is a plan view of the body member shown in section in FIG. 1.

The tailpiece member 22 is provided with a pair of axially extending holes 34 and 36. It is to be noted that the hole 34 is shown to be of smaller diameter than the hole 36 and that it is located further from the axis of the tailpiece member 22 than the hole 36. The hole 36 terminates at one end in an axially extending groove 36a from the end of tailpiece member 22 to shoulder 28a of contact support member 28. As is well understood by those skilled in the art, when a thermocouple contact member is inserted into the hole 36, a surface of the contact member is exposed between the shoulder 28a and the end of tailpiece 24 to provide for electrical connection to one side of the thermocouple. Similarly, although not shown, the hole 34 terminates in an axially extending groove from the base 29 of the tailpiece member 22 to the shoulder 28a of the contact support member 28. There is thereby provided an exposed contact surface from the other thermocouple contact member.

Referring to FIG, 6, there is disclosed a thermocouple assembly 38 comprising a thermocouple securing member 40 molded of a resilient plastic such as polypropylene. The lower portion of the thermocouple securing member 40 is provided with a pair of projections 42 and 43 for supporting a thermocouple contact member 44, and a second pair of projections 45 and 46 for supporting a second thermocouple contact member 48. The thermocouple securing member 40 is also provided with a series of projections 49, 50, 51, and 52, for supporting a thermocouple protection tube 54 which as well known to those skilled in the art is generally formed of quartz or fused silica. In view of the resiliency of the molded plastic from which thermocouple securing member 40 is constructed, the thermocouple protection tube 54 may be snapped into location between the projections 49, 50, and the projections 51 and 52. Within the thermocouple protection tube 54 the thermocouple wires 56 and 58 are joined at the end of the bight in order to produce at the bight a thermocouple junction. The wire 56 is then welded or in any other suitable manner secured to the thermocouple contact member 44 while the thermocouple wire 58 is similarly secured to the thermocouple contact member 48.

Figure 7:
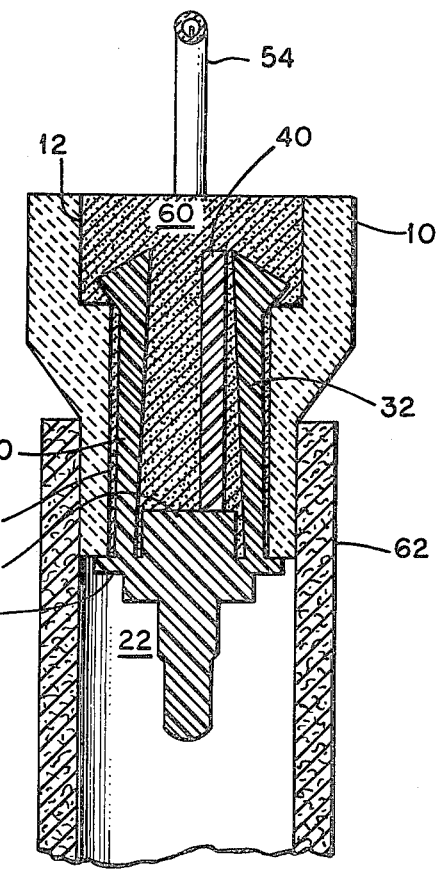
FIG. 7 is a sectional view of a completed expendable immersion thermocouple unit using the invention.

In order to assemble the body member 10, the tailpiece member 22, and the thermocouple assembly 38 into a complete expendable immersion thermocouple as shown in FIG. 7, the tailpiece member 22 is positioned at the bottom end of the body member 10 with the resilient arms 30 and 32 engaging the lower openings of the axially extending grooves 18 and 20 in the body member 10. In view of the resiliency of the arms 30 and 32, the enlarged distal ends of the arms 30 and 32 may be forced toward each other either by applying sufficient force between the tailpiece member 22 and the body member 20, or by manually exerting a force on the resilient arms 30 and 32 to cause them to deflect toward each other. With the arms so deflected, the enlarged portions of the distal ends of the arms 30 and 32 will pass along the grooves 18 and 20 as the tailpiece member 22 is inserted into the lower cavity 14 of the body member 10. The body member 10 and the tailpiece member 22 are so dimensioned that when the flange 26 engages the end of the body member 10, the enlarged portions of the distal ends of the arms 30 and 32 will extend beyond the circumferential shoulder 16 into the first irregularly shaped cylindrical cavity 12.

When the enlarged distal ends of the arms 30 and 32 enter into the cavity 12, the arms 30 and 32 will, in view of the resiliency of the material, tend to assume their original undistorted position. This resiliency of the arms will tend to firmly lock the tailpiece 22 in position in the body member 10 with the flange 26 tightly secured against the bottom edge of the body member 10. While a particular configuration has been shown for the enlarged distal ends of the arms 30 and 32, it is to be understood that many modifications of the shape of the ends of the arm may be used depending upon the results desired. It will be recognized that if the surfaces 30a and 32a should extend from the arms 30 and 32 respectively at right angles, then the latching action between the surfaces 30a and 32a and the circumferential shoulder 16 would be determined by the strength of the materials of the arms 30 and 32 and the body member 10.

Figure 3:
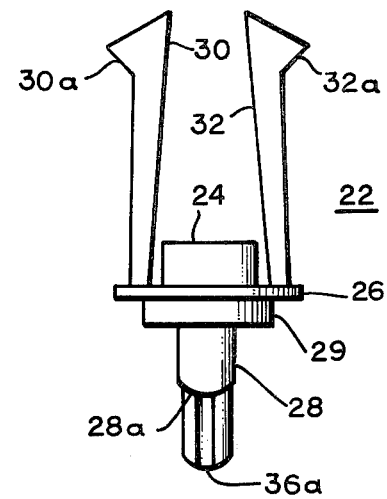
FIG. 3 is a side elevation of a tailpiece member of an expendable immersion thermocouple device.
Figure 1:
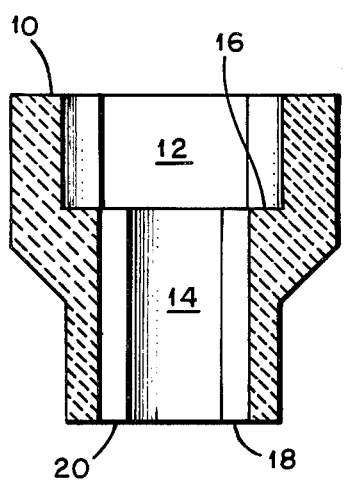
FIG. 1 is a sectional view of a body member of an expendable immersion thermocouple.
Figure 5:
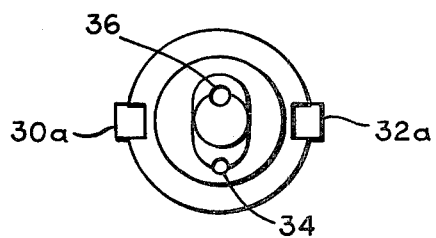
FIG. 5 is a bottom elevation of the tailpiece member of FIG. 3.
Figure 6:
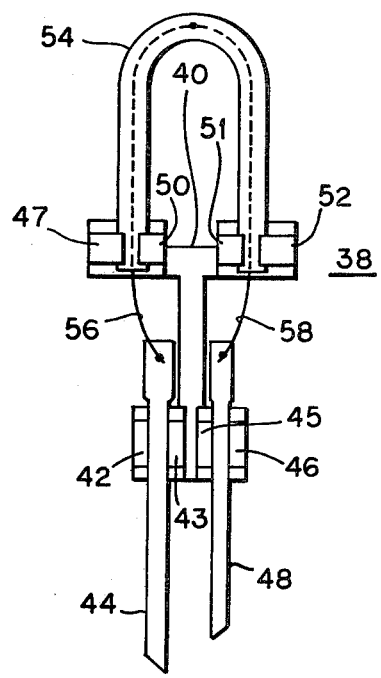
FIG. 6 is a side elevation of the thermocouple and electrical conductors of an expendable immersion thermocouple unit.

In FIG. 3 it will be noted that the surfaces 30a and 32a do not extend at right angles from the arms 30 and 32, but provide an inclined slope. While the latching action of the inclined slope is not as great as the latching action that would exist if the surfaces 30a and 32a were at right angles to the arms 30 and 32, the inclined slope has certain advantages. With the surfaces 30a and 32a inclined, the length of the arms 30 and 32 need not be exactly the same length as the grooves 18 and 20 to hold the flange 26 tightly against the bottom edge of the body member 10. With the arms 30 and 32 shorter than the grooves 18 and 20, the edge of the circumferential shoulder 16 will rest on the surfaces 30a and 32a with the flange 26 secured against the bottom edge of body member 10. With such an arrangememnt, the resiliency of the arms 30 and 32 will maintain the flange 26 tightly against the bottom of the body member 10. It will be appreciated that if the surfaces 30a and 32a should be at right angles to the arms 30 and 32, the arrangement would not be tolerant of dimensional variations in the length of the cavity 14 or in lengths of the arms 30 and 32. If the grooves 18 and 20 were too short for the arms 30 and 32, there would be no latching action at all, whereas if the grooves 18 and 20 were too long for the arms 30 and 32, the flange 26 would not be secured against the body member 10 but would have motion relative thereto.

FIG. 7 shows a sectional view in which the body member 10 and the tailpiece member 22 have been secured together by the latched arms 30 and 32 of the tailpiece member 22 with the circumferential flange 26 firmly seated against the bottom edge of the body member 10. With the tailpiece member 22 assembled into the body member 10, the next step of assembly is to insert the thermocouple assembly 38 into the body member 10 so that the thermocouple contact member 44 slides into the hole 36 and the thermocouple contact member 48 slides into the hole 34. The thermocouple securing member 40 rests on the top surface of the plug portion 24 of the tailpiece member 22 with the lower end of thermocouple contact member 44 exposed between the end of the tailpiece member and the shoulder 28a and the thermocouple contact member 48 exposed between the shoulder 28a and the base 29. With the parts so assembled, the upper cavity 12 and the lower cavity 14 are filled with a refractory cement 60 which, when dried, forms a rigid body having desirable electrical and heat insulating properties, and serves to maintain the various parts of the expendable immersion thermocouple unit in fixed position relative to each other. In order that the expendable immersion thermocouple may be immersed in molten metal, the unit is inserted into the end of a cardboard or other suitable heat insulating tube 62. As well known to those skilled in the art, the thermocouple may be protected from mechanical damage by a thin metallic cap which covers the end of the thermocouple unit and melts away shortly after the unit is immersed in molten metal.

What is claimed is:

1. In an expendable immersion thermocouple for determining the temperature of molten metal
   a cylindrical body member open at both ends;
   a tailpiece member having a plug portion for supporting said thermocouple,
   a contact portion for providing a resilient contact backup, and
   a flange portion for seating against one end of said body member; and
   latching means for securing said body member and said tailpiece member together including at least one latch element resiliently supported by said tailpiece member and a cooperating latch element in the inner surface of said body member.

2. The combination set forth in claim 1 in which said tailpiece member is made of a molded resilient plastic and said one latch element is an extending arm of said molding with the distal end of said arm having an enlarged portion.

3. The combination set forth in claim 2 in which said cooperating latch element is a shoulder within said body member that cooperates with said enlarged portion in the distal end of said extending arm.

4. In an expendable immersion thermocouple the combination of
   a cylindrical body member;
   an opening extending through said member, said opening forming a first irregularly shaped cylindrical cavity in one end of said body member joined by a second smaller irregularly shaped cylindrical cavity in the other end of said body member;
   a circumferential shoulder formed at the juncture of said first and said second cavities;
   a pair of axially extending grooves in the opposite sidewalls of said second cavity; and a tailpiece member having a plug portion sized to fit within said second cavity and including thermocouple lead wire support holes, a circumferential flange located on said tailpiece member and sized to close the end of said second cavity, and a pair of resilient arms extending from said tailpiece member in a direction to occupy said grooves when said tailpiece member is inserted in said body member, said resilient arms having enlarged distal ends to latch with said shoulder when said support member is inserted into said housing member with said flange in contact with the end of said housing member.

5. In an expendable immersion thermocouple a cylindrical housing member having an opening therethrough said opening at one end being of greater dimension than the opening at the other end to form within said opening a circumferential shoulder, a pair of diametrically opposed longitudinal grooves in the inner sidewalls of said housing in the end of said housing having the lesser dimension, said grooves extending from the end of said housing to said shoulder, and a tailpiece member of molded resilient plastic having a plug portion, a circumferential flange, and a pair of axially extending arms having enlarged distal end portions, said axially extending arms dimensioned to extend into said longitudinal grooves with the enlarged portions providing a latching force with said shoulder with said flange secured against the end of said housing member and said plug portion and said circumferential flange closing the end of said opening.

* * * * *